(12) United States Patent
Liang et al.

(10) Patent No.: US 12,004,066 B2
(45) Date of Patent: *Jun. 4, 2024

(54) PATH, PATH INFORMATION PROCESSING METHOD AND DEVICE, STORAGE MEDIUM AND ELECTRONIC DEVICE

(71) Applicant: ZTE Corporation, Shenzhen (CN)

(72) Inventors: Shuang Liang, Shenzhen (CN); Jinguo Zhu, Shenzhen (CN); Zhijun Li, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,664

(22) Filed: Mar. 20, 2023

(65) Prior Publication Data

US 2023/0232306 A1    Jul. 20, 2023

Related U.S. Application Data

(63) Continuation of application No. 17/217,318, filed on Mar. 30, 2021, now Pat. No. 11,638,196, which is a
(Continued)

(30) Foreign Application Priority Data

Sep. 30, 2018   (CN) .......................... 201811163347.2

(51) Int. Cl.
  *H04W 40/02*   (2009.01)
  *H04L 45/02*   (2022.01)
  *H04W 8/22*    (2009.01)
(52) U.S. Cl.
  CPC ............. *H04W 40/02* (2013.01); *H04L 45/02* (2013.01); *H04W 8/22* (2013.01)

(58) Field of Classification Search
  CPC ......... H04W 40/02; H04W 8/22; H04W 8/14; H04W 8/26; H04W 80/10; H04L 45/02
  See application file for complete search history.

(56) References Cited

U.S. PATENT DOCUMENTS 11,638,196 B2 *   4/2023   Liang ...................... H04L 45/02
                                                               370/310
2017/0339609 A1   11/2017  Youn et al.
(Continued)

FOREIGN PATENT DOCUMENTS

| CN | 108400997 A | 8/2018 |
| CN | 108401273 A | 8/2018 |
| CN | 108605254 A | 9/2018 |

OTHER PUBLICATIONS

Chinese Office Action with English Translation of Notification of the First Office Action for Chinese Patent Application No. 2018111633472 dated Aug. 30, 2022, 28 pages.
(Continued)

*Primary Examiner* — Marisol Figueroa
(74) *Attorney, Agent, or Firm* — Crowell & Moring LLP

(57) ABSTRACT

Provided are a path, a path information processing method and device, a storage medium, and an electronic device. The path processing method may be performed by an I-SMF and include: receiving a first message sent by an anchor-session management function (A-SMF), wherein the first message comprises context information associated with a User Equipment (UE); determining, according to the context information, a mode corresponding to a data path established by the I-SMF, wherein the mode is indicative of whether the data path supports a Protocol Data Unit (PDU) session with multi-homing function; and determining a node type of a node according to the mode, wherein the node type comprises an uplink classifier (UL-CL) or a branching point (BP).

16 Claims, 8 Drawing Sheets

An I-SMF receives a first message sent by an A-SMF, where the first message includes context information — S402

The I-SMF determines, according to the context information, a mode corresponding to a data path established by the I-SMF, and selects a data path — S404

Related U.S. Application Data continuation of application No. PCT/CN2019/109299, filed on Sep. 30, 2019.

(56) References Cited

U.S. PATENT DOCUMENTS

| | | |
|---|---|---|
| 2018/0199240 A1 | 7/2018 | Dao et al. |
| 2018/0279180 A1 | 9/2018 | Lee et al. |

OTHER PUBLICATIONS

Cisco, "Updates to Solution 5", SA WG2 Meeting #128 82-187017, Jul. 6, 2018, 7 pages.
ZTE, "Solution for AF influence on traffic routing", SA WG2 Meeting #127 S2-184158, Apr. 23, 2018, 3 pages.
Extended European Search Report for European Patent Application No. 198646739 dated May 25, 2022, 11 pages.
Cisco et al: "Updates to Solution 5", 3GPP Draft; S2-187113_WAS7017_WASB447_UPDATE TO SOL 5V4, 3rd Generation Partnership Project (3GPP), Mobil Competence Centre; 650, Route des Lucioles; F-06921 Sophia-Antipolis Cedex; France, vol. SA WG2, No. Vilnius, Lithuania; Jul. 2, 2018-Jul. 6, 2018 Jul. 6, 2018 (Jul. 6, 2018), XP051538551, Retrieved from the Internet: URL:http://www.3gpp.org/ftp/tsg%5Fsa/WG2%5FArch/TSGS2%5F128%5FVilnius/Docs/S2%2D187113%2Ezip [retrieved on Jul. 6, 2018].
Huawei et al: "UL-CL insertion when ULCL is in different region comparing to A-SMF", 3GPP Draft; S2-186785 UL-CL Insertion When ULCL is in Different Region Comparing to A-SMF, 3rd Generation Partnership Project (3GPP), Mobil Competence Centre; 650, Route Des Lucioles; F-06921 SOPHI, vol. SA WG2, No. Vilnius, Lithuania; Jul. 2, 2018-Jul. 6, 2018 Jul. 1, 2018 (Jul. 1, 2018), XP051469930, Retrieved from the Internet: URL:http://www.3gpp.org/ftp/Meetings%5F3GPP%5FSYNC/SA2/Docs [retrieved on Jul. 1, 2018].
ZTE et al: "Evaluation on solution 16", 3GPP Draft; S2-189007 was 8768 Etsun Solution 16, 3rd Generation Partnership Project (3GPP), Mobil Competence Centre; 650, Route Des Lucioles; F-06921 Sophia-Antipolis Cedex; France, vol. SA WG2, No. Sophia Antipolis, France; Aug. 26, 2018 (Aug. 26, 2018), XP0515377 49, Retrieved from the Internet: URL:http://www.3gpp.org/ftp/tsg%5Fsa/WG2%5FArch/TSGS2%5F128BIS%5FSophia%%FAntipolis/Docs/S2%2D189007%2Ezip [retrieved on Aug. 26, 2018].
Huawei Technologies: "pCR TS 32.255 Addition of Message flow of SSC Mode", 3GPP Draft; S5-185374 REL-15 PCR 32.255 Addition of Message Flow of the SSC Mode, 3rd Generation Partnership Project (3GPP), Mobil Competence Centre; 650, Route Des Lucioles; F-06921 Sophia-Antipol, vol. SA WG5, No. Belgrade (Serbia); Aug. 20, 2018-Aug. 24, 2018 Aug. 24, 2018 (Aug. 24, 2018), XP051544000, Retrieved from the Internet: URL:http://www.3gpp.org/ftp/tsg%5Fsa/WG5%5FTM/TSGS5%5F120/Docs/S5%2D185374%2Ezip [retrieved on Aug. 24, 2018].
International Search Report and Written Opinion with English Translation of International Patent Application No. PCT/CN2019/109299 dated Jan. 8, 2020; 9 pages.
Huawei et al. "UL-CL Insertion When ULCL is in Different Region Comparing to A-SMF", SA WG2 Meeting #128, S2-186785 notes, Section 1-2, Vilnius, Lithuania, Jul. 6, 2018; 11 pages.
Ericsson, "Evaluation of Solutions to KI#5", SA WG2 Meeting #128bis, S2-187762 notes, Sophia Antipolis, France, Aug. 24, 2018; 10 pages.
Korean Office Action with English Translation of Summary of Office Action for Korean Patent Application No. 10-2021-7009465 dated Nov. 29, 2023, 7 pages.

\* cited by examiner

An A-SMF sends a first message to an I-SMF, where the first message includes context information for the I-SMF to determine a mode corresponding to an established data path and to select a data path — S502

FIG. 5

An A-SMF sends a second message to a selected I-SMF, where the second message is used for indicating a mode corresponding to a data path established by the I-SMF — S602

FIG. 6

A selected I-SMF receives a second message sent by an A-SMF, where the second message is used for indicating a mode corresponding to a data path established by the I-SMF — S702

The I-SMF selects a data path according to the second message — S704

FIG. 7

PATH, PATH INFORMATION PROCESSING METHOD AND DEVICE, STORAGE MEDIUM AND ELECTRONIC DEVICE

This application is based on and claims priority to U.S. Non-Provisional application Ser. No. 17/217,318, filed on Mar. 30, 2021, which is a continuation application of PCT International Patent Application No. PCT/CN2019/109299, filed with the China National Intellectual Property Administration, PRC on Sep. 30, 2019 which claims priority to Chinese Patent Application No. 201811163347.2, filed with the China National Intellectual Property Administration, PRC on Sep. 30, 2018, each of which is incorporated herein by reference in their entireties.

TECHNICAL FIELD

The present disclosure relates to the field of communications and, in particular, to a path, a path information processing method and device, a storage medium, and an electronic device.

BACKGROUND

In order to maintain the competitiveness of third generation mobile communication systems in the field of communications, to provide users with faster, lower delay, more personalized mobile communication services while reducing the operating costs of operators, the 3rd Generation Partnership Project (3GPP) standards working group is working on the research of next generation wireless mobile access networks. In the next-generation radio access network (NG-RAN), there is a unified core network that supports access of various radio networks, and it is desirable that the coupling relationship between a radio access network (RAN) and a core network (CN) can be minimized, that is, a user equipment (UE) accesses the unified CN regardless of which access technology the UE adopts to access the RAN. The function of the core network in the next generation network supports a service-based interface to support a more flexible deployment mode. In the related art, the intermediate-session management function (I-SMF) cannot decide whether to insert an uplink classifier (UL-CL) or a branching point (BP), so that the network structure cannot meet the routing requirements.

SUMMARY

Embodiments of the present disclosure provide a path, a path information processing method and device, a storage medium, and an electronic device, to at least solve the problem that the network structure cannot meet the routing requirements due to the failure that the I-SMF cannot decide whether to insert a UL-CL or a BP.

A path processing method is provided according to an embodiment of the present disclosure. The method includes: receiving, by an I-SMF, a first message sent by an A-SMF, where the first message includes context information; and determining, by the I-SMF according to the context information, a mode corresponding to a data path established by the I-SMF and selecting a data path.

A path information processing method is provided according to an embodiment of the present disclosure. The method includes: sending, by an A-SMF, a first message to an I-SMF, where the first message includes context information for the I-SMF to determine a mode corresponding to an established data path and to select a data path.

A path information processing method is provided according to an embodiment of the present disclosure. The method includes: sending, by an A-SMF, a second message to a selected I-SMF, where the second message is used for indicating a mode corresponding to a data path established by the I-SMF.

A path information processing method is provided according to an embodiment of the present disclosure. The method includes: receiving, by a selected I-SMF, a second message sent by an A-SMF, where the second message is used for indicating a mode corresponding to a data path established by the I-SMF; and selecting, by the I-SMF, a data path according to the second message.

A path processing device is provided according to an embodiment of the present disclosure. The device is located in an I-SMF and includes: a first receiving module, which is configured to receive a first message sent by an A-SMF, where the first message includes context information; and a determination module, which is configured to determine a mode corresponding to a data path established by the I-SMF and select a data path according to the context information.

A path information processing device is provided according to an embodiment of the present disclosure. The device is located in an A-SMF and includes: a first sending module, which is configured to send a first message to a I-SMF, wherein the first message comprises context information used by the I-SMF to determine a mode corresponding to an established data path and to select a data path.

A path information processing device is provided according to an embodiment of the present disclosure. The device is located in an A-SMF and includes a second sending module, which is configured to send a second message to a selected I-SMF, where the second message is used for indicating a mode corresponding to a data path established by the I-SMF.

A path information processing device is provided according to an embodiment of the present disclosure. The device is located in an I-SMF and includes: a second receiving module, which is configured to receive a second message sent by an A-SMF, where the second message is used for indicating a mode corresponding to a data path established by the I-SMF, and a selection module, which is configured to select a data path according to the second message.

A storage medium is further provided according to another embodiment of the present disclosure. The storage medium is configured to store a computer program which is configured to, when running, perform any of the methods described above.

An electronic device is further provided according to another embodiment of the present disclosure. The electronic device includes a memory and a processor. The memory is configured to store a computer program, and the processor is configured to execute the computer program to perform any of the methods described above.

BRIEF DESCRIPTION OF DRAWINGS

FIG. 5 is a flowchart of a path information processing method according to an embodiment of the present disclosure;

FIG. 6 is a flowchart of another path information processing method according to an embodiment of the present disclosure;

FIG. 7 is a flowchart of another path information processing method according to an embodiment of the present disclosure;

DETAILED DESCRIPTION

The present disclosure will be explained below with reference to drawings and in conjunction with embodiments. If there is no conflict, the embodiments in the present disclosure and the characteristics in the embodiments can be combined with each other.

The terms "first", "second", "third" and the like in the description and in the claims, are used for distinguishing between similar objects and not necessarily for describing a sequential or chronological order.

Figure 1:
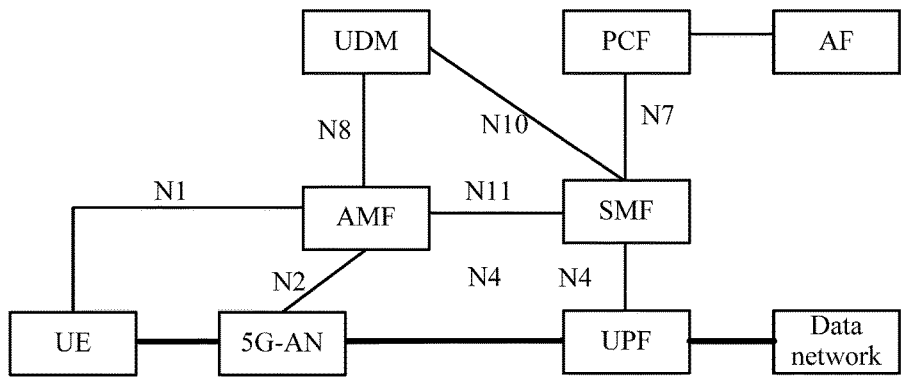
FIG. 1 is a basic architecture of a network in the related art.

FIG. 1 is a basic architecture of a network in the related art. As shown in FIG. 1, the basic architecture of the network is shown below.

The access management function is a common control plane function in the core network and terminates non access stratum messages between all users and the network. One user is responsible for only one AMF. The user mobility management includes location registration and temporary identifier allocation, and the user mobility management selects an appropriate network slice instance and a session management function (SMF) instance when a user initiates a packet data unit (PDU) connection establishment request, forwards non access stratum (NAS) signaling between the UE and the session control plane function, and forwards access stratum (AS) signaling between the base station and the session control plane function.

The session management function (SMF) is responsible for managing the connections between the UE and the data network, and selecting an appropriate transmission path for the UE, that is, selecting a user plane function (UPF). In order to improve the management efficiency, the user plane and the control plane are separated from each other for the management of data connections. The SMF is responsible for establishing, modifying and deleting the data connection, and the data flow is transmitted through the UPF. The UPF performs different levels of control and forwarding on the data connection and the data flow therein according to authorization information of the quality of service (QoS) for the current data connection obtained from the SMF.

The policy control function is responsible for formulating a policy for the UE according to the subscription of the user, the current location of the UE, and the application-related information, including a routing policy, a QoS policy, a charging policy, and the like. The application function (AF) may affect the routing of the UE according to the requirements of the application, for example, some services are suitable for transceiving over a local data network. The requirements of the AF are routed to the SMF via the PCF under specific routing rules, which may trigger the SMF to choose to insert or re-select a UPF to accommodate the routing requirements of the application.

Figure 2:
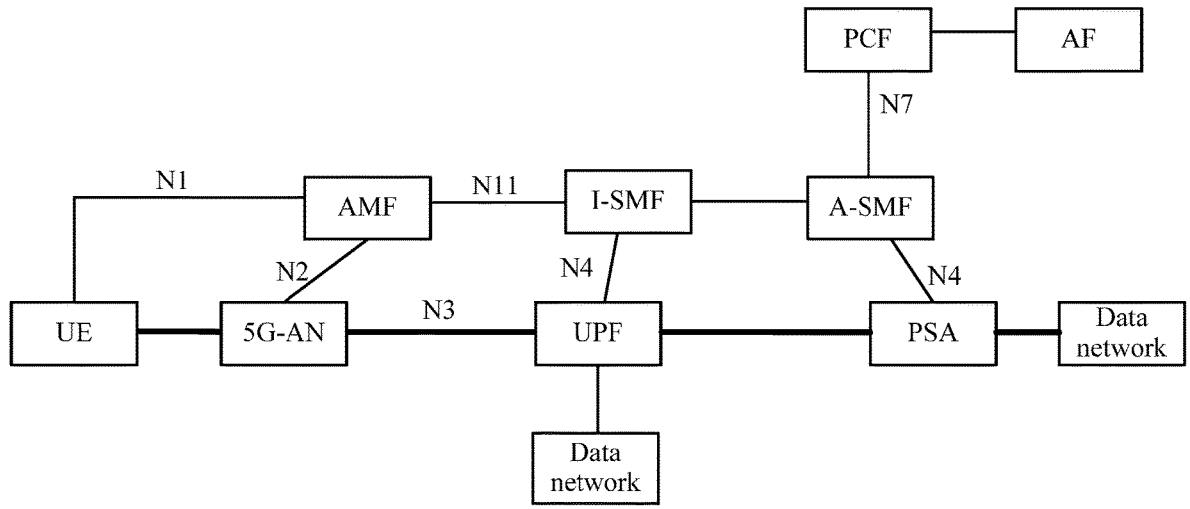
FIG. 2 is a basic architecture of another network in the related art.

FIG. 2 is a basic architecture of another network in the related art. As shown in FIG. 2, the PDU Session Anchor (PSA) itself is the UPF in the above figure, but in order to emphasize that the PSA is the anchor of a UE-specific PDU session, subsequent descriptions are described with the PSA. The SMFs controlling the PSA are referred to as the anchor-SMF (A-SMF), and the functions of the A-SMF are consistent with those of the SMF in FIG. 1. During the movement of the UE, the 5th generation access network (5G-AN) triggers the insertion of an intermediate-SMF (I-SMF) when the UPF capable of establishing the N3 connection cannot be controlled by the A-SMF.

In addition, in the network architectures shown in FIGS. 1 and 2, different data flows in the same PDU session of the UE are supported to be transmitted to the same data network (DN) through different data paths in some cases, which may be implemented in two modes. In the mode 1, a UPF with the uplink classifier function, that is, the UL-CL, is inserted to route the data flow that conforms to the filtering rule to the data network through the local route. In the mode 2, the UE acquires two address that are directed to different PDU session anchors through a branching point (BP), that is, through one PDU session, and different address are bound to different uplink data flows. These data flows are converged in one BP and distributed to unused PDU session anchors. The difference between the mode 2 and the mode 1 is that the UE in the mode 1 is unperceived, and the decision of different paths for the uplink data is made by the UL-CL. However, in the mode 2, since two addresses need to be allocated to the UE, the UE needs to support the multi-homing function, and the UE supporting the Internet Protocol Version 6 (IPv6) address optionally supports this function. The UE supporting this function sends different application data through different addresses according to the routing policy.

There is a problem that due to the introduction of the I-SMF, the I-SMF is required to decide whether to insert a UL-CL or a BP while the I-SMF does not know how to insert a UL-CL or a BP. Therefore, the network structure in the related art cannot meet the routing requirements.

Embodiment One

Figure 3:
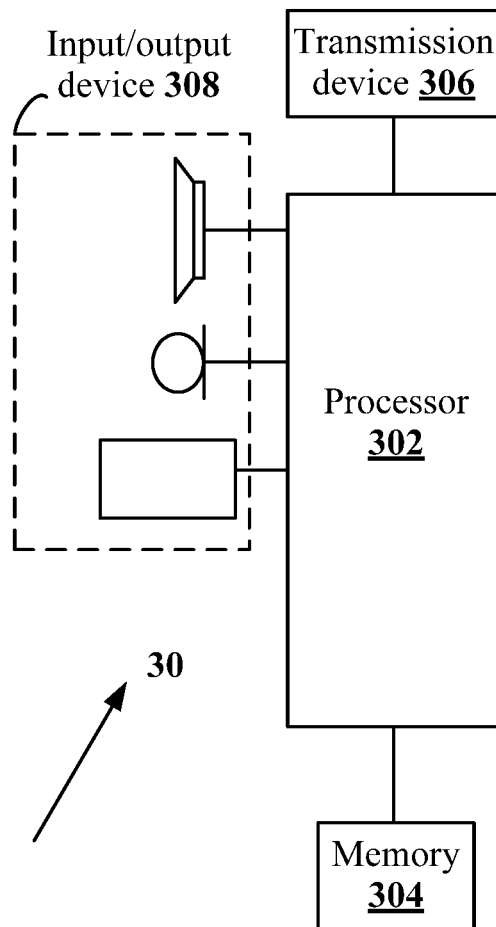
FIG. 3 is a block diagram showing hardware structures of a mobile terminal according to an embodiment of the present disclosure.

The method embodiments provided in Embodiment 1 of the present disclosure may be executed in a mobile terminal, a computer terminal, or a similar computing device. The following is described below by using an example in which Embodiment 1 is executed in a mobile terminal. FIG. 3 is a hardware structural block of a mobile terminal according to an embodiment of the present disclosure. As shown in FIG. 3, the mobile terminal 30 may include one or more processors 302 (only one processor is shown in FIG. 3 and the processor 302 may include a microprocessor such as a microprocessor control unit (MCU) or a processing device such as a field programmable gate array (FPGA)) and a memory 304 for storing data. Optionally, the preceding mobile terminal may further include a transmission device 306 for the communication function and an input/output device 308. The structure shown in FIG. 3 is merely illustrative and does not limit the structure of the preceding mobile terminal. For example, the mobile terminal 30 may also include more or fewer components than those shown in FIG. 3, or have a different configuration other than that shown in FIG. 3.

The memory 304 may be configured to store a computer program, for example, a software program and a module of application software, such as a computer program corresponding to the method in the embodiment of the present disclosure. The processor 302 executes the computer program stored in the memory 304 to execute a plurality of functional applications and data processing, that is, to implement the preceding method. The memory 304 may include a high-speed random access memory, and may further include a non-volatile memory such as one or more magnetic storage devices, flash memories, or other non-volatile solid-state memories. In some examples, the memory 304 may include memories remotely disposed relative to the processor 302, and these memories may be connected to the mobile terminal 30 via a network. Examples of the preceding network include the Internet, an intranet, a local area network, a mobile communication network, and combinations thereof.

The transmission device 306 is configured to receive or send data via a network. Examples of the preceding network may include a wireless network provided by a communication provider of the mobile terminal 30. In one example, the transmission device 306 includes a network adapter such as a network interface controller (NIC), and the network adapter may be connected to other network devices via the base station to communicate with the Internet. In one example, the transmission device 306 may be a radio frequency (RF) module which is configured to communicate with the Internet via wireless means.

Figure 4:
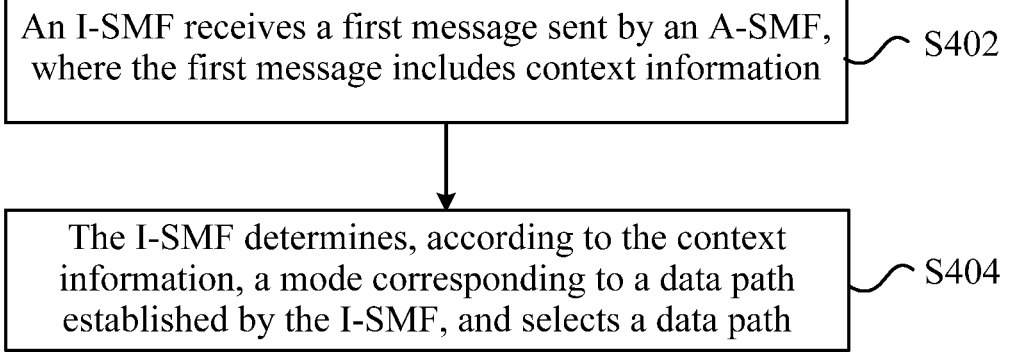
FIG. 4 is a flowchart of a path processing method according to an embodiment of the present disclosure.

In the embodiment, a path information processing method running on the preceding mobile terminal is provided. FIG. 4 is a flowchart of a path information processing method according to an embodiment of the present disclosure. As shown in FIG. 4, the method includes steps S402 to S404.

In S402, an I-SMF receives a first message sent by an A-SMF, where the first message includes context information.

In S404, the I-SMF determines, according to the context information, a mode corresponding to a data path established by the I-SMF, and selects a data path.

Through the present disclosure, since the information for selecting the data path is sent to the I-SMF through the A-SMF, the problem in the related art that the network structure cannot meet the routing requirements because the I-SMF cannot decide whether to insert a UL-CL or a BP can be solved, thereby achieving the effect of optimizing the data path and making the implementation manner simple.

Optionally, the step in which the I-SMF determines, according to the context information, the mode corresponding to the data path established by the I-SMF and selects the data path includes: determining, by the I-SMF, whether to insert a node between current data path; in response to determining that the node is inserted between current data path, determining, by the I-SMF, a node type of the node, where the node type includes a UL-CL or a BP; and establishing, by the I-SMF, a data path according to the node type, and using the established data path.

Optionally, in response to determining that no node is inserted between current data path, the I-SMF uses a current data path.

Optionally, the I-SMF determines the node type according to capability information of the UE and/or preference information of the UE.

Optionally, the step in which the I-SMF determines, according to the context information, the mode corresponding to the data path established by the I-SMF and selects the data path includes: sending, by the I-SMF, a session establishment request to the determined node for requesting the node to establish a session with the I-SMF and a data network, respectively.

Optionally, in response to the node type being the BP, the method further includes: allocating, by the I-SMF, address information corresponding to the established data path to the UE.

Optionally, in response to the node type being the BP, the method further includes: instructing, by the SMF, the A-SMF to allocate the address information to the UE and to send a routing rule corresponding to the established data path, and/or allocating, by the I-SMF, the address information to the UE, and sending the routing rule corresponding to the established data path.

In the embodiment, a path information processing method running on the preceding mobile terminal is provided. FIG. 5 is a flowchart of a path information processing method according to an embodiment of the present disclosure. As shown in FIG. 5, the method includes step S502.

In S502, an A-SMF sends a first message to an I-SMF, where the first message includes context information for the I-SMF to determine a mode corresponding to an established data path and to select a data path.

Through the description of the above implementation, the method of the embodiment may be implemented by means of software plus a general hardware platform, and of course may also be implemented by means of hardware. The solutions of the present disclosure may be embodied in the form of a software product. The computer software produce is stored in a storage medium (such as a read-only memory (ROM)/random access memory (RAM), a magnetic disk, an optical disc), includes a plurality of instructions for causing one terminal device (which may be a mobile phone, a computer, a server, a network device, or the like) to perform the method described in the embodiment of the present disclosure.

Embodiment Two

In the embodiment, a path processing method running on the preceding mobile terminal is provided. FIG. 6 is a flowchart of another path information processing method according to an embodiment of the present disclosure. As shown in FIG. 6, the method includes the step S602.

In S602, an A-SMF sends a second message to a selected I-SMF, where the second message is used for indicating a mode corresponding to a data path established by the I-SMF.

Optionally, before the A-SMF sends the second message to the selected I-SMF, the method further includes: sending, by the A-SMF, selection indication information to an AMF, where the selection indication information is used for instructing the AMF to select the I-SMF.

Optionally, before the A-SMF sends the second message to the I-SMF, the method further includes: determining, by the A-SMF, a node type corresponding to a node inserted in a data path, where the node type includes a UL-CL or a BP; and generating, by the A-SMF, the second message according to the node type.

Optionally, the A-SMF determines the node type according to capability information of a UE and/or preference information of the UE.

Optionally, when the node type is the BP, the A-SMF notifies the I-SMF to allocate address information corresponding to the updated data path to the UE.

Optionally, when the node type is the BP, the I-SMF further notifies the A-SMF to instruct the I-SMF to allocate the address information to the UE and to send a routing rule corresponding to the established data path, and/or the I-SMF allocates the address information to the UE and sends the routing rule corresponding to the established data path.

In the embodiment, a path information processing method running on the preceding mobile terminal is provided. FIG. 7 is a flowchart of another path information processing method according to an embodiment of the present disclosure. As shown in FIG. 7, the method includes steps S702 to S704.

In S702, a selected I-SMF receives a second message sent by an A-SMF, where the second message is used for indicating a mode corresponding to a data path established by the I-SMF.

In S704, the I-SMF selects a data path according to the second message.

Optionally, the second message further includes a node type corresponding to a node determined by the A-SMF and inserted in the data path, where the node type includes a UL-CL or a BP.

Optionally, the method further includes: determining, by the I-SMF, whether to insert a node in the data path.

Optionally, in response to determining that the node is inserted in the data path, the I-SMF uses the established data path; and in response to determining that no node is inserted in the data path, the I-SMF uses a current data path.

Optionally, after the I-SMF acquires the second information, the I-SMF sends a session establishment request to the inserted node to request the node to establish a session with the I-SMF and the data network, respectively.

In one embodiment, in order to better understand the solutions described in the embodiment, the present disclosure further provides the following scenarios to understand the solutions described in the present disclosure.

Scenario 1

Figure 8:
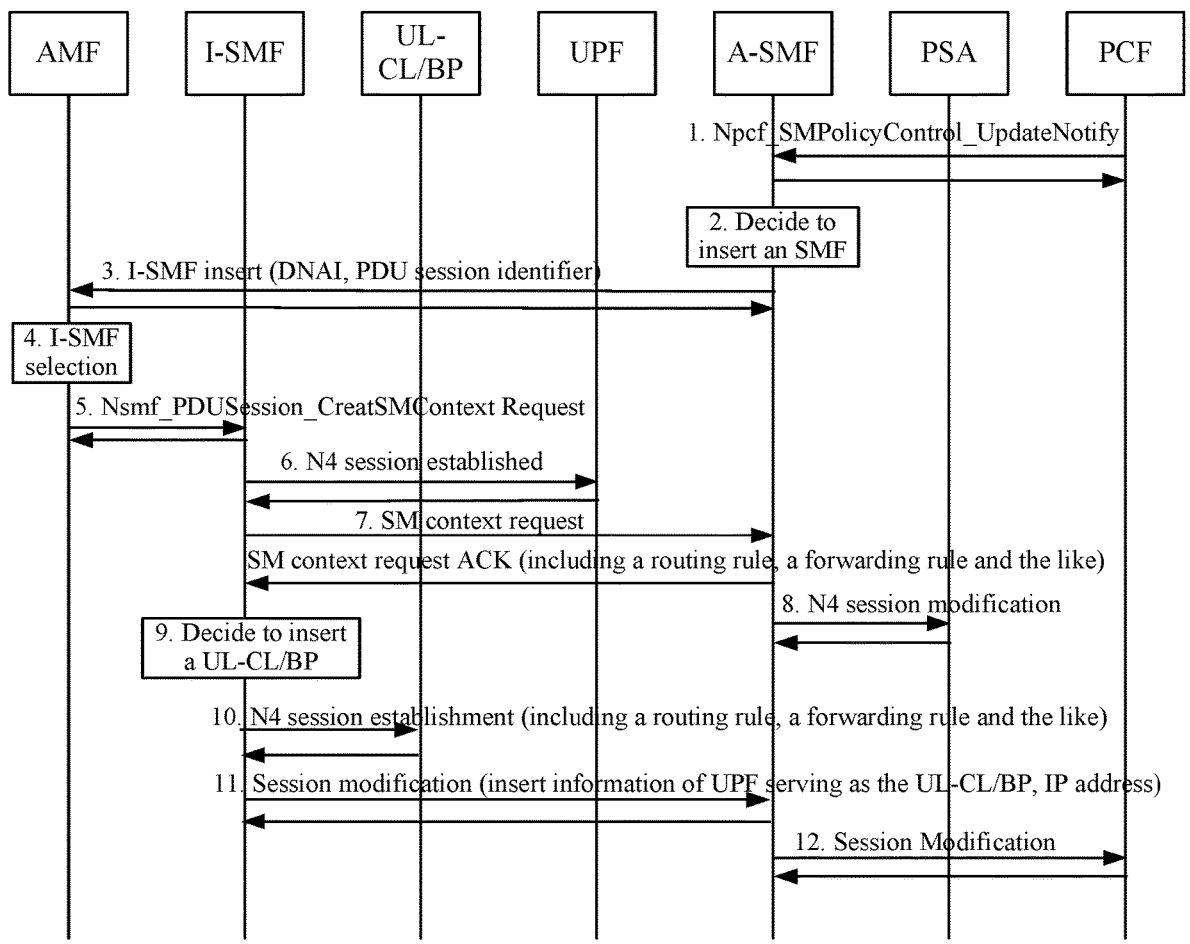
FIG. 8 is a diagram showing path processing based on scenario 1 according to an embodiment of the present disclosure.

The I-SMF determines whether to trigger the insertion of the UL-CL/BP and confirms the type of inserted node according to the relevant policy sent by the A-SMF. FIG. 8 is a diagram showing path processing based on scenario 1 according to an embodiment of the present disclosure. As shown in FIG. 8, the path processing includes the steps described below.

In step 1, the PCF determines that the data route may need to be changed according to the request of the AF. The PCF updates the policy sent to the A-SMF, where the policy includes routing policy information such as a DN access identifier (DNAI).

In step 2, the A-SMF determines according to the DANI that all the connected UPFs cannot provide the route to the DNAI for the terminal, and thus determines that a new I-SMF needs to be selected.

In step 3, the A-SMF sends an N11 interface message to the AMF to trigger the selection of one I-SMF, where the N11 interface message includes a PDU session ID and the DNAI.

This method is also applicable to the that the AMF chooses to insert a I-SMF according to the location of the terminal, the service area of the SMF, or the service area of the UPF. In this point, steps 1 to 3 are not executed, but start with the execution of step 4.

In step 4, the AMF selects an I-SMF according to the DNAI provided by the A-SMF and the location information of the terminal.

In step 5, the AMF sends the SM context create request message Nsmf_PDUSession_CreateSMContext to the selected I-SMF, where the message includes an identifier of the UE, a data network name (DNN), a PDU session identifier, an identifier of the AMF, an identifier of the target DNAI, and an identifier or an address of the A-SMF. The I-SMF that receives the message creates session management (SM) context and returns a response to the AMF.

In step 6, the I-SMF selects an appropriate intermediate-UPF (I-UPF) and sends an N4 session establishment request to the I-UPF, where the request includes address and tunnel information for the N3 and N9 interfaces.

In step 7, the I-SMF requests a message of the SM context from the A-SMF, where the message is used for requesting the context of the terminal, updating the connection between the I-SMF and the A-SMF, and providing related information about the N9 interface. The existing messages of the SM context may be reused, or a new message having this function may be defined. The message provides information of the N9 interface data tunnel, where the information may include address and tunnel information, an identifier or address of the I-SMF, and a PDU session identifier. The A-SMF carries the SM context associated with the PDU session identifier in the returned response, where the SM context includes the indication of whether the BP can be inserted, and further includes information of the N9 interface data tunnel which may be address and tunnel information.

In step 8, the A-SMF sends an N4 session modification message to the PSA to update the N9 tunnel information.

In step 9, after the I-SMF receives the context from the A-SMF, the I-SMF decides to implement the multipath of a single PDU session in the mode of UL-CL or BP according to the BP capability in the SM. The I-SMF selects an appropriate UPF supporting UL-CL or BP, and sends an N4 session establishment request to the selected UL-CL/BP, where the request includes address and tunnel information for the N3 and N9 interfaces.

When the mode of BP is applied, the I-SMF allocates a new Internet Protocol (IP) address to the terminal. The IP address may be acquired from the UPF selected by the I-SMF, or from a network repository function (NRF), or from a dynamic host configuration protocol/authentication, authorization, accounting (DHCP/AAA) server.

In step 10, the I-SMF sends an information notification message to the A-SMF, where the message is used for updating the connection between the I-SMF and the A-SMF and providing the related information of the N9 interface. The existing information notification messages may be reused, or a new message having this function may be defined. The message provides information of the N9 interface data tunnel, where the information may be address and tunnel information, an identifier or address of the I-SMF, and a PDU session identifier. If the BP is inserted and there is a mode of the A-SMF notifying the terminal, the message also includes the IP address newly allocated to the terminal. The A-SMF receives the address and then sends it to the terminal via a router advertisement (RA) message, and updates the corresponding routing rule. If the BP is inserted and it is the I-SMF that notifies the terminal, the I-SMF sends the RA message to the terminal, where the RA message includes the newly allocated address information and the related routing rule.

In step 11, the A-SMF sends an N4 session modification message to the PSA to update the N9 tunnel information.

In one embodiment, if the data path is unchanged, steps 9 to 11 are not executed.

In step 12, for example, the PCF perceives the insertion of the I-SMF. Step 12 may be executed after step 8, even if steps 9 to 11 are not executed. If the PCF does not need to perceive the insertion of the I-SMF or does not subscribe to other change notifications in the process, step 12 may not be executed.

In one embodiment, if in steps 9 to 11, the I-SMF adopts the mode of BP and newly allocates the IP address, step 12 also needs to be executed to notify the PCF of another address.

If in steps 9 to 11, the I-SMF adopts the mode of BP and newly allocates an IP address, step 12 also needs to be executed to notify the PCF of another address.

Scenario 2

Figure 9:
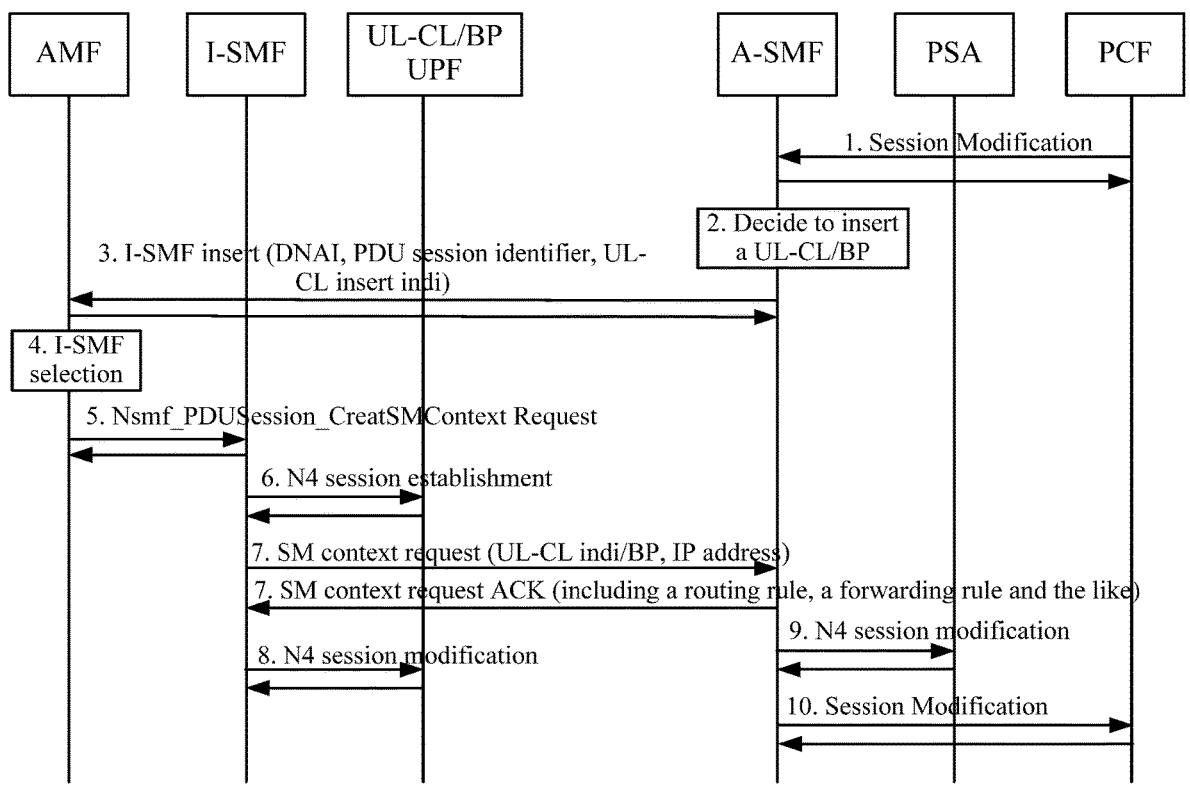
FIG. 9 is a diagram showing path processing based on scenario 2 according to an embodiment of the present disclosure.

The A-SMF determines whether the inserted node type is the UL-CL or the BP, and the I-SMF determines whether to trigger the insertion of the UL-CL/BP according to the related information sent by the A-SMF. FIG. 9 is a diagram showing path processing based on scenario 2 according to an embodiment of the present disclosure. As shown in FIG. 9, the terminal has established a PDU session, and the PSA serves as an anchor for the session.

In step 1, the PCF determines that the data route may need to be changed according to the request of the AF. The PCF updates the policy sent to the A-SMF, where the policy includes routing policy information such as DNAI.

In step 2, the A-SMF determines, according to the DANI information that all the connected UPFs cannot provide the route to the DNAI for the terminal, and thus determines that a new I-SMF needs to be selected.

In step 3, the A-SMF sends an N11 interface message to the AMF to trigger the selection of one I-SMF, where the message includes a PDU session identifier and the DNAI. This message may include an indication of whether the BP can be inserted.

In step 4, the AMF selects an I-SMF according to the DNAI provided by the A-SMF and the location information of the terminal.

In step 5, the AMF sends an Nsmf_PDUSession_CreateSMContext request message to the selected I-SMF, where the Nsmf_PDUSession_CreateSMContext request message includes the identifier of the UE, the DNN, the PDU session identifier, the identifier of the AMF, the identifier of the target DNAI, and the identifier or address of the A-SMF. The I-SMF that receives the message creates the SM context and returns a response to the AMF. The message may further include the indication of whether the BP can be inserted received by the AMF from the A-SMF in step S3. The meaning of this indication is consistent with that described in step 3.

In step 6, the I-SMF determines whether the UL-CL/BP needs to be inserted according to the DNAI and the terminal location provided by the A-SMF and the capability indication selection (that is, the BP capability, or the indication of whether the BP can be inserted), and if the UL-CL/BP needs to be inserted, the UL-CL UPF is determined to be inserted according to the capability of the UPF. The I-SMF selects a UL-CL/BP UPF and sends an N4 session establishment request to the I-UPF, where the request includes address and tunnel information for the N3 and N9 interfaces.

In step 7, the I-SMF requests a message of the SM context from the A-SMF, where the message is used for requesting the context of the terminal, updating the connection between the I-SMF and the A-SMF, and providing related information about the N9 interface. The existing messages of the SM context may be reused, or a new message having this function may be defined. The message provides information of the N9 interface data tunnel, where the information may be address and tunnel information, an identifier or address of the I-SMF, and a PDU session identifier. If the BP is inserted in step 5, the message also includes the address newly allocated for the terminal. The A-SMF receives the address and then sends it to the terminal via the RA message, and updates the corresponding routing rule. If the BP is inserted and the I-SMF needs to notify the terminal, the I-SMF may send an RA message to the terminal after receiving an A-SMF response message, the RA message includes the newly allocated address information and the associated routing rule. The A-SMF carries the SM context associated with the PDU session identifier in the returned response, where the SM context includes information of the N9 interface data tunnel which may be address and tunnel information.

In step 8, the A-SMF sends an N4 session modification message to the PSA to update the N9 tunnel information.

In step 9, the I-SMF sends an N4 session update request to the I-UPF, where the N4 session update request includes the address and tunnel information of the N9 interface.

In step 10, if the PCF perceives the insertion of the I-SMF or perceives the addition of a new address, the A-SMF notifies the PCF.

Scenario 3

Figure 10:
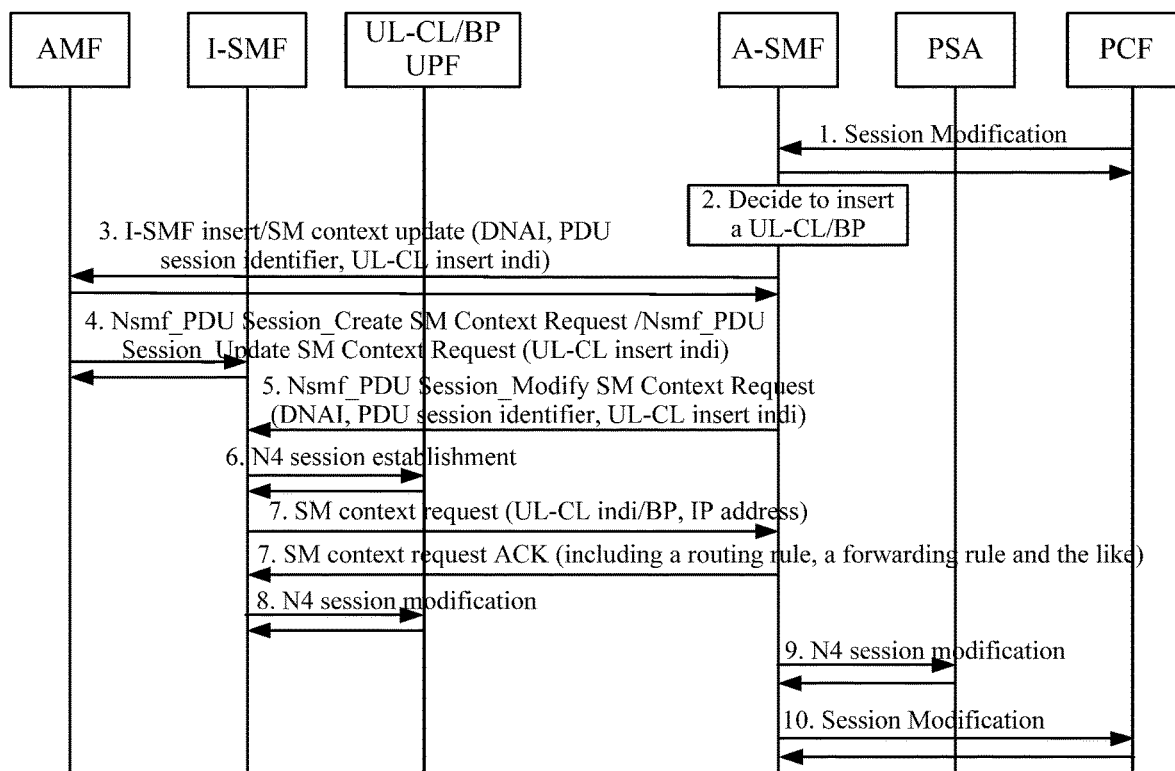
FIG. 10 is a diagram showing path processing based on scenario 3 according to an embodiment of the present disclosure.

The A-SMF determines whether the inserted node type is the UL-CL or the BP, and the I-SMF determines whether to trigger the insertion of the UL-CL/BP according to the related information sent by the A-SMF. FIG. 10 is a diagram showing path processing based on scenario 3 according to an embodiment of the present disclosure. As shown in FIG. 10, the terminal has established a PDU session, and the PSA serves as an anchor of the session. The AMF has inserted the I-SMF according to the location of the terminal, the service area of the SMF, or the service of the UPF. When there is no interface between the I-SMF and the PCF, the PCF sends a relevant policy through the A-SMF, and the A-SMF forwards the relevant policy to the I-SMF, where the relevant policy carries a UL-CL/BP insertion indication.

In step 1, the PCF determines that the data route may need to be changed according to the request of the AF. The PCF updates the policy sent to the A-SMF, where the policy includes routing policy information such as DNAI.

In step 2, the A-SMF determines, according to the DANI information that all the connected UPFs cannot provide the route to the DNAI for the terminal, and thus determines that a new I-SMF needs to be selected.

In step 3, the I-SMF requests a message from the A-SMF for the SM context, and the message is transmitted transparently to the I-SMF through the AMF.

In step 4, the AMF sends a Nsmf_PDUSession_CreateSMContext request message to the selected I-SMF, where the Nsmf_PDUSession_CreateSMContext request message includes the identifier of the UE, the DNN, the PDU session identifier, the identifier of the AMF, the identifier of the target DNAI, and the identifier or the address of the A-SMF.

The I-SMF that receives the message creates the SM context and returns a response to the AMF.

In step 5, the A-SMF sends a message to the I-SMF, where the message includes the identifier of the UE, the DNN, the session identifier of the PDU, the DNAI of the target, and the indication of the insertion of the UL-CL or the BP.

In one embodiment, if the relevant messages of the I-SMF and the A-SMF can be sent directly (that is, these messages are not forwarded by the AMF), steps 3 to 5 are not executed, but step 6 and subsequent processes are executed directly after step 5.

In step 6, the I-SMF decides whether to insert the UL-CL/BP according to the DNAI and the terminal location provided by the A-SMF, and decides to insert the UL-CL UPF according to the capability of the UPF if the UL-CL/BP needs to be inserted. The I-SMF selects a UL-CL/BP UPF and sends an N4 session establishment request to the I-UPF, where the request includes address and tunnel information for the N3 and N9 interfaces.

In step 7, the I-SMF requests a message of the SM context from the A-SMF, where the message is used for requesting the context of the terminal, updating the connection between the I-SMF and the A-SMF, and providing related information about the N9 interface. The existing messages of the SM context may be reused, or a new message having this function may be defined. The message provides information of the N9 interface data tunnel, where the information may be address and tunnel information, an identifier or address of the I-SMF, and a PDU session identifier. If the BP is inserted in step 5, the message also includes the address newly allocated for the terminal. The A-SMF receives the address and then sends it to the terminal via the RA message, and updates the corresponding routing rule. If the BP is inserted and the I-SMF needs to notify the terminal, the I-SMF may send an RA message to the terminal after receiving an A-SMF response message, the RA message includes the newly allocated address information and the associated routing rule. The A-SMF carries the SM context associated with the PDU session identifier in the returned response, where the SM context includes information of the N9 interface data tunnel which may be address and tunnel information.

In step 8, the A-SMF sends an N4 session modification message to the PSA to update the N9 tunnel information.

In step 9, the I-SMF sends an N4 session update request to the I-UPF, where the N4 session update request includes the address and tunnel information of the N9 interface.

In step 10, if the PCF perceives the insertion of the I-SMF or perceives the addition of a new address, the A-SMF notifies the PCF.

Scenario 4

Figure 11:
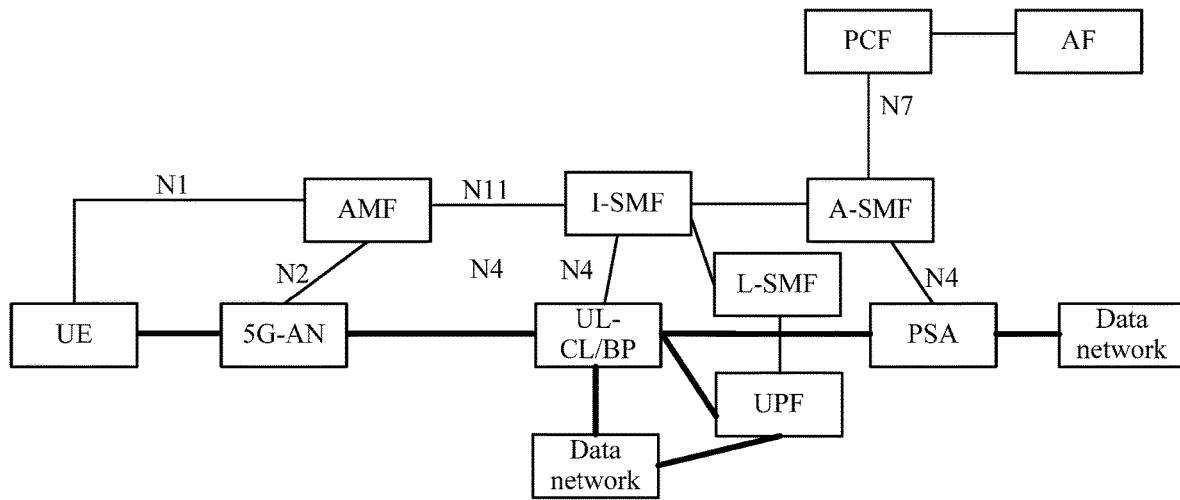
FIG. 11 is a schematic diagram of a network architecture based on scenario 4 according to an embodiment of the present disclosure.

FIG. 11 is a diagram showing path processing based on scenario 4 according to an embodiment of the present disclosure. As shown in FIG. 11, the I-SMF may select a local SMF (L-SMF) to execute the local service, that is, the following architecture is supported.

In this point, in the above embodiment, after the I-SMF is inserted, the I-SMF determines whether the L-SMF needs to be inserted. Although the insertion of the UL-CL/BP is determined by the I-SMF, in the case where an L-SMF needs to be inserted and the BP is inserted, the new IP address is allocated by the L-SMF, and the L-SMF sends the new IP address to the I-SMF. Other processes are similar to Scenarios 1 to 3 described above.

Embodiment Three

The embodiment further provides a path processing device. The device is configured to implement the preceding embodiments and optional embodiments, and what has been described will not be repeated herein. As used below, the term "module" may implement a combination of software and/or hardware having predetermined functions. The device described in the following embodiments may be implemented in software, an implementation through hardware, or a combination of software and hardware is also possible and contemplated.

Figure 12:
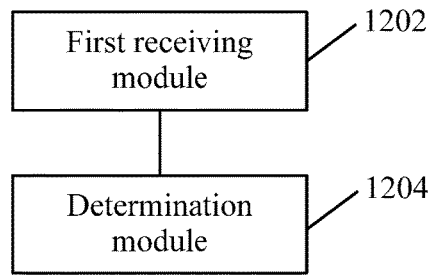
FIG. 12 is a structural diagram of a processing device according to an embodiment of the present disclosure.

FIG. 12 is a structural diagram of a processing device according to an embodiment of the present disclosure. As shown in FIG. 12, the device is located in the I-SMF, and includes a first receiving module 1202 and a determination module 1204.

The first receiving module 1202 is configured to receive a first message sent by an A-SMF, where the first message includes context information. The determination module 1204 is configured to determine a mode corresponding to a data path established by the I-SMF and select a data path according to the context information.

In the embodiment, a path information processing device is further provided. The device is configured to implement the preceding embodiments and optional embodiments, and what has been described will not be repeated herein.

Figure 13:
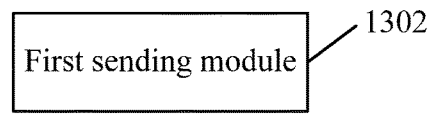
FIG. 13 is a structural diagram of a path information processing device according to an embodiment of the present disclosure.

FIG. 13 is a structural diagram of a path information processing device according to an embodiment of the present disclosure. As shown in FIG. 13, the device includes a first sending module 1302.

The first sending module 1302 is configured to send a first message to an I-SMF, where the first message includes context information for the I-SMF to determine a mode corresponding to an established data path and to select a data path.

In one embodiment, the preceding plurality of modules may be implemented by software or hardware, and the implementation by the manner of hardware may be implemented, but is not limited to, in the following manners: the preceding modules are located in the same processor, or the preceding plurality of modules are respectively located in different processors in various combinations.

Embodiment Four

Figure 14:
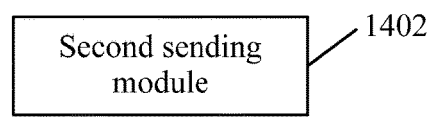
FIG. 14 is a structural diagram of another path information processing device according to an embodiment of the present disclosure.

FIG. 14 is a structural diagram of another path information processing device according to an embodiment of the present disclosure. As shown in FIG. 14, the device includes a second sending module 1402.

The second sending module 1402 is configured to send a second message to a selected I-SMF, where the second message is used for indicating a mode corresponding to a data path established by the I-SMF.

In the embodiment, a path information processing device is further provided. The device is configured to implement the preceding embodiments and optional embodiments, and what has been described will not be repeated herein.

Figure 15:
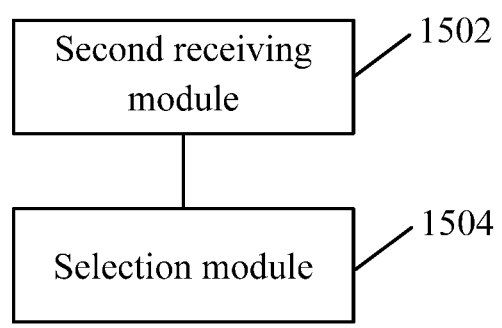
FIG. 15 is a structural diagram of another path information processing device according to an embodiment of the present disclosure.

FIG. 15 is a structural diagram of another path information processing device according to an embodiment of the present disclosure. As shown in FIG. 15, the device includes a second receiving module 1502 and a selection module 1504.

The second receiving module 1502 is configured to receive a second message sent by an A-SMF, where the second message is used for indicating a mode corresponding to a data path established by the I-SMF.

The selection module 1504 is configured to select a data path according to the second message.

In one embodiment, the preceding plurality of modules may be implemented by software or hardware, and the implementation by the manner of hardware may be implemented, but is not limited to, in the following manners: the preceding modules are located in the same processor, or the preceding plurality of modules are respectively located in different processors in various combinations.

Embodiment Five

The embodiment of the present disclosure further provides a storage medium having a computer program stored thereon, where the computer program is configured to, when running, perform the method in any one of the embodiments described above.

Optionally, in the embodiment, the storage medium may include a universal serial bus flash disk (USB flash disk), a read-only memory (ROM), a random access memory (RAM), a removable hard disk, a magnetic disk, an optical disc, or other various mediums capable of storing computer programs.

The embodiment of the present disclosure further provides an electronic device. The electronic device includes a memory and a processor. The memory is configured to store a computer program, and the processor is configured to execute the computer program to perform the method in any one of the embodiments described above.

Optionally, the electronic device may further include a transmission device and an input/output device, and both devices are connected to the preceding processor.

Optionally, for the examples in the embodiment, reference may be made to the examples described in the above embodiments and optional embodiments.

The various modules or steps of the present disclosure may be implemented by a general-purpose computing device, and they may be centralized on a single computing device or distributed over a network composed of a plurality of computing devices. Optionally, they may be implemented by program codes executable by the computing device, and may be stored in a storage device and then executed by the computing device. In some circumstances, the steps illustrated or described herein may be executed in a different order than presented herein, or may be separately made into a plurality of integrated circuit modules, or a plurality of modules or steps among these modules or steps may be made into a single integrated circuit module. Therefore, the present disclosure is not limited to specific combinations of hardware and software.

What is claimed is:

1. A path processing method, performed by an intermediate-session management function (I-SMF), comprising:
    receiving a first message sent by an anchor-session management function (A-SMF), wherein the first message comprises context information associated with a User Equipment (UE);
    determining, according to the context information, a mode corresponding to a data path established by the I-SMF, wherein the mode is indicative of whether the data path supports a Protocol Data Unit (PDU) session with multi-homing function; and
    determining a node type of a node according to the mode, wherein the node type comprises an uplink classifier (UL-CL) or a branching point (BP).

2. The method of claim 1, wherein before receiving the first message, the method further comprises:
    transmitting, to the A-SMF, a second message requesting the context information associated with the UE.

3. The method of claim 1, wherein the node type is associated with a capability information of the UE or a preference information of the UE.

4. The method of claim 1, wherein the node type is BP, the method further comprising:
    transmitting address information corresponding to the data path to the UE.

5. The method of claim 4, wherein the address information comprising an Internet Protocol (IP) address allocated to the UE, the method further comprising:
    acquiring the address information from at least one of:
        a User Plane Function (UPF) selected by the I-SMF;
        a network repository function (NRF); or
        a dynamic host configuration protocol/authentication, authorization, accounting (DHCP/AAA) server.

6. The method of claim 5, wherein transmitting the address information corresponding to the data path to the UE comprises at least one of:
    instructing the A-SMF to transmit the address information and a routing rule corresponding to the data path to the UE; or
    transmitting the address information and the routing rule corresponding to the data path to the UE.

7. The method of claim 1, further comprising:
    transmitting, to the A-SMF, a notification message notifying the A-SMF to update a connection between the A-SMF and the I-SMF.

8. A path processing method, performed by an anchor-session management function (A-SMF), comprising:
    receiving, from a Policy Control Function (PCF), a second message indicating a routing policy for the UE needs to be updated, wherein the second message comprises a data network access identifier (DNAI); and
    transmitting a first message to an intermediate-session management function (I-SMF), wherein the message comprises context information associated with a User Equipment (UE) and indicative of a mode corresponding to a data path established by the I-SMF, the mode being indicative of whether the data path supports a Protocol Data Unit (PDU) session with multi-homing function.

9. The method of claim 8, further comprising:
    determining, based on the second message, that a new I-SMF needs to be selected; and
    transmitting, to an Access and Mobility Management Function (AMF), a third message to trigger the AMF to select the I-SMF.

10. The method of claim 9, wherein the third message comprises at least one of:
    a PDU session identifier;
    the DNAI; or
    an indicator indicating whether a BP can be inserted.

11. The method of claim 8, wherein the node type is BP, the method further comprising: notifying the I-SMF to send an address information corresponding to the data path to the UE, wherein the address information comprises an Internet Protocol (IP) address allocated to the UE.

12. A network element comprising a memory for storing computer instructions and a processor in communication with the memory, wherein, when the processor executes the computer instructions, the processor is configured to cause the network element to:
    receive a first message sent by an anchor-session management function (A-SMF), wherein the first message comprises context information associated with a User Equipment (UE);

determine, according to the context information, a mode corresponding to a data path established by the network element, wherein the mode is indicative of whether the data path supports a Protocol Data Unit (PDU) session with multi-homing function; and determine a node type of a node according to the mode, wherein the node type comprises an uplink classifier (UL-CL) or a branching point (BP).

13. The network element of claim 12, wherein, before the processor is configured to cause the network element to receive the first message, the processor is configured to cause the network element to:

transmit, to the A-SMF, a second message requesting the context information associated with the UE.

14. The network element of claim 12, wherein the node type is BP, and wherein, when the processor executes the computer instructions, the processor is configured to further cause the network element to:

transmit address information corresponding to the data path to the UE.

15. The network element of claim 14, wherein the address information comprising an Internet Protocol (IP) address allocated to the UE, and wherein, when the processor executes the computer instructions, the processor is configured to further cause the network element to:

acquire the address information from at least one of:
- a User Plane Function (UPF) selected by the network element;
- a network repository function (NRF); or
- a dynamic host configuration protocol/authentication, authorization, accounting (DHCP/AAA) server.

16. The network element of claim 15, wherein, when the processor is configured to cause the network element to transmit the address information corresponding to the data path to the UE, the processor is configured to cause the network element to perform at least one of:

instructing the A-SMF to transmit the address information and a routing rule corresponding to the data path to the UE; or transmitting the address information and the routing rule corresponding to the data path to the UE.

* * * * *